United States Patent
Pamato et al.

(10) Patent No.: US 9,502,958 B2
(45) Date of Patent: Nov. 22, 2016

(54) AUTOMATIC SHORT LED DETECTION FOR LIGHT EMITTING DIODE (LED) ARRAY LOAD

(71) Applicant: Infineon Technologies AG, Neubiberg (DE)

(72) Inventors: Marco Pamato, Schio (IT); Damiano Sartori, Padua (IT); Maurizio Galvano, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/610,781

(22) Filed: Jan. 30, 2015

(65) Prior Publication Data

US 2016/0226373 A1    Aug. 4, 2016

(51) Int. Cl.
| | | |
|---|---|---|
| *H05B 37/02* | (2006.01) | |
| *H02M 1/36* | (2007.01) | |
| *H05B 33/08* | (2006.01) | |

(52) U.S. Cl.
CPC ........... *H02M 1/36* (2013.01); *H05B 33/0809* (2013.01); *H05B 33/0824* (2013.01); *H05B 37/02* (2013.01)

(58) Field of Classification Search
CPC .............................. H05B 33/08; H05B 37/02
USPC ............. 315/185 R, 186, 192, 294, 307, 308
See application file for complete search history.

(56) References Cited

U.S. PATENT DOCUMENTS

| | | | |
|---|---|---|---|
| 2008/0164828 A1* | 7/2008 | Szczeszynski | G05F 1/46 315/300 |
| 2008/0169772 A1* | 7/2008 | Liu | H05B 33/0896 315/297 |
| 2010/0264828 A1 | 10/2010 | Cortigiani et al. | |
| 2010/0328370 A1* | 12/2010 | Takata | G09G 3/342 345/694 |
| 2011/0234122 A1* | 9/2011 | Yu | G09G 3/3406 315/297 |
| 2012/0074947 A1 | 3/2012 | Cortigiani et al. | |
| 2014/0015427 A1* | 1/2014 | Sagen | H05B 33/083 315/186 |
| 2014/0042924 A1* | 2/2014 | Lee | H05B 33/0803 315/210 |

\* cited by examiner

*Primary Examiner* — Tung X Le
(74) *Attorney, Agent, or Firm* — Shumaker & Sieffert, P.A.

(57) ABSTRACT

During a start-up phase, each corresponding test current is delivered to a corresponding chain of loads of a plurality of chain of loads. Each chain of loads is coupled between a common node and a corresponding output node. Each chain of loads includes N series-coupled loads, where N is an integer greater than one. A maximum voltage is determined from among the output voltages, where the output voltages are the voltages at the output nodes. Also, a minimum voltage is determined from among the output voltages. The maximum voltage from among the output voltages is compared with the minimum voltage from among the output voltages to make a determination as to whether the maximum voltage exceeds the minimum voltage by a threshold. An indication is output based on a result of the determination.

20 Claims, 4 Drawing Sheets

FIG. 4

AUTOMATIC SHORT LED DETECTION FOR LIGHT EMITTING DIODE (LED) ARRAY LOAD

TECHNICAL FIELD

This disclosure relates to electronic circuits, and more specifically to failure detection in chains of electronic loads, such as in light emitting diodes (LEDs).

BACKGROUND

Illumination devices (e.g., lamps) that comprise light emitting diodes (LEDs) as luminescent components usually cannot simply be connected to a voltage supply but have to be driven by special driver circuits (or control circuits) providing a defined load current to the LEDs in order to provide a desired radiant power (radiant flux). Since a single LED exhibits only small forward voltages (from about 1.5 V for infrared GaAs LEDs ranging up to 4 V for violet and ultraviolet InGaN LEDs) compared to commonly used supply voltages (for example, 12 V, 24 V and 42 V in automotive applications) several LEDs are connected in series to form so-called LED chains.

In many applications, it is desirable to have a fault detection included in the driver circuits (or control circuits) that allows for detecting defective LEDS in the LED chains connected to the driver circuit. An LED can be regarded as a two-terminal network. A defective LED can manifest in either an open circuit or a short circuit between the two terminals. If one LED of a LED chain fails as an open circuit this is relatively easy to detect since the defective LED interrupts the current for the whole LED chain. If one LED of a LED chain fails as a short circuit, however, only the defective LED stops radiating, which may be more difficult to detect.

SUMMARY

In some examples, a method comprises: during a start-up phase: delivering each corresponding current of a plurality of currents to a corresponding chain of loads of a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one; determining a maximum voltage from among a plurality of output voltages, wherein each of the plurality of output voltages corresponds to a separate one of the plurality of output nodes; determining a minimum voltage from among the plurality of output voltages; and comparing the maximum voltage with the minimum voltage to make a determination as to whether the maximum voltage exceeds the minimum voltage by a threshold; and outputting an indication based on a result of the determination.

In some examples, a device comprises: a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one; current source circuitry that is arranged to deliver, during a start-up phase, each corresponding current of a plurality of currents to a corresponding chain of loads of the plurality of chain of loads; and a detection unit that is arranged to: during the start-up phase: determine a maximum voltage from among a plurality of output voltages, wherein each corresponding output voltage is a voltage at the corresponding output node of the plurality of output nodes; determine a minimum voltage from among the plurality of output voltages; compare the maximum voltage threshold with the minimum voltage threshold to make a determination as to whether the maximum voltage threshold exceeds the minimum voltage threshold by a threshold; and output an indication based on a result of the determination.

In some examples, a device comprises: means for providing, during a start-up phase, each corresponding current of a plurality of currents to a corresponding chain of loads of a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one; means for determining, during the start-up phase, a maximum voltage from among a plurality of output voltages, wherein each corresponding output voltage is a voltage at the corresponding output node of the plurality of output nodes; means for determining, during the start-up phase, a minimum voltage from among the plurality of output voltages; and means for comparing, during the start-up phase, the maximum voltage threshold with the minimum voltage threshold to make a determination as to whether the maximum voltage threshold exceeds the minimum voltage threshold by a threshold; and means for providing, during the start-up phase, an indication based on a result of the determination.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may be the case. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal. The verb "output", and forms of the verb "output" included "outputting", means that some component, sub-component, and/or the like outputs the signal (or the like) at a node (or the like). "Output" should not necessarily be construed to mean the ultimate output, so that, for example, an internal signal that is output by a particular sub-component is still regarded as being "output" by that sub-component.

Figure 1:
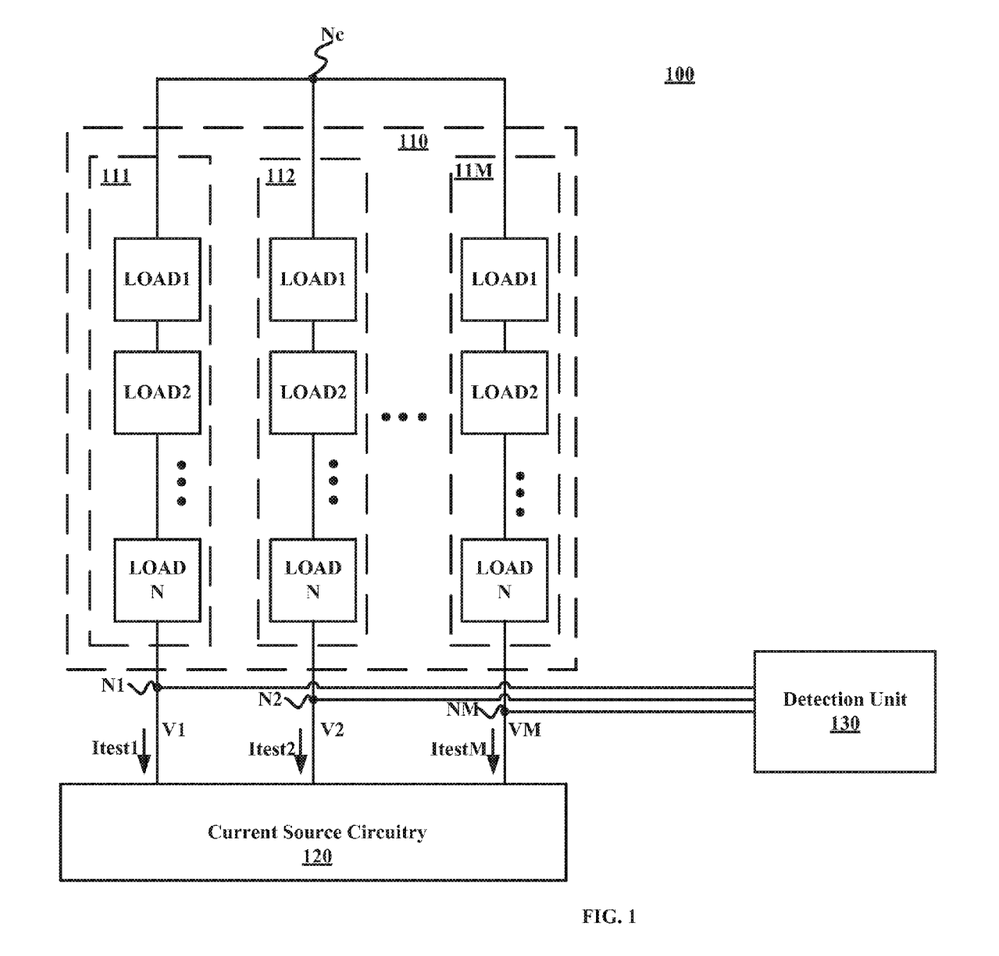
FIG. 1 is a block diagram illustrating an example of a circuit for failure detection for chains of electronic loads.

FIG. 1 is a block diagram illustrating an example of a circuit (100) capable of implementing failure detection for chains of electronic loads 110. Circuit 100 includes plurality of chain of loads 110, current source circuitry 120, and detection unit 130.

Plurality of chain of loads 110 includes M chains of loads 111-11M. Each chain of loads (111-11M) is coupled between a common node (Nc) and a corresponding output node (V1-VM). Each chain of loads (111-11M) includes N series-coupled loads (LOAD1-LOADN), where N is an integer greater than one.

Current source circuitry 120 is arranged to deliver, during a start-up phase, each corresponding test current (Itest1-ItestM) to a corresponding chain of loads (111-11M). Responsive to the test current, plurality of chains of loads 110 provides output voltages V1-VM at nodes N1-NM, respectively.

Detection unit 130 is arranged to, during the start-up phase, determine a maximum voltage from among output voltages V1-VM, determine a minimum voltage from among output voltages V1-VM, and compare the maximum voltage from output voltages V1-VM with the minimum voltage from among the output voltages to V1-VM make a determination as to whether the maximum voltage exceeds the minimum voltage by a threshold (i.e., whether a difference between the maximum voltage and the minimum voltage exceeds a threshold); and output an indication based on a result of the determination.

Figure 2:
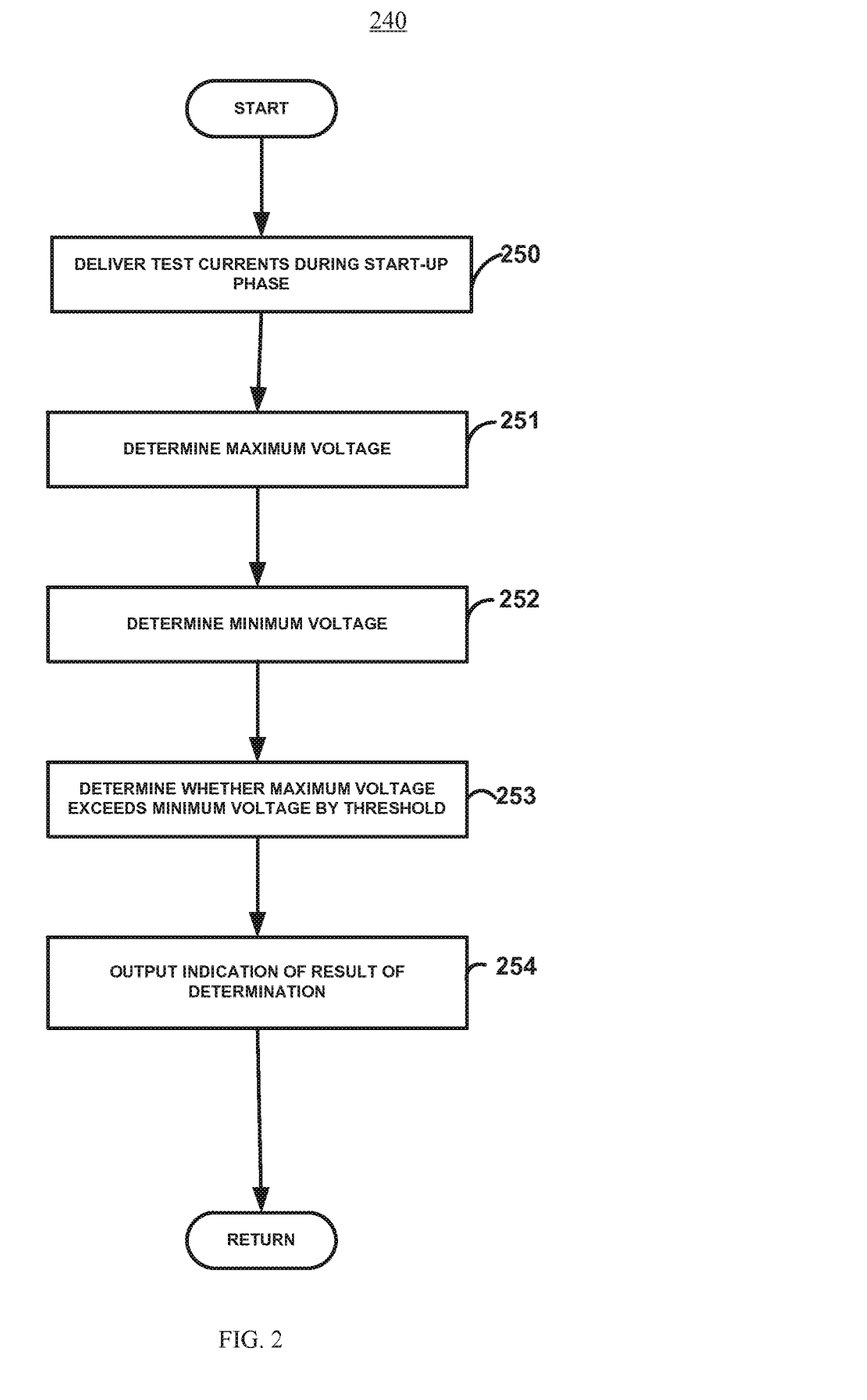
FIG. 2 is a flow diagram illustrating an example of a process for failure detection for chains of electronic loads.

FIG. 2 is a flow diagram illustrating an example of a process (240) for failure detection for chains of electronic loads. The following is one example of process 240 as performed by circuit 100. However, the disclosure is not so limited, and other suitable devices and/or circuits may implement the process of FIG. 2 in other examples within the scope and spirit of the disclosure.

After a start block, current source circuitry (e.g., current source circuitry 120 of FIG. 1) delivers each corresponding test current (e.g., Itest1-ItestM) to a corresponding chain of loads (e.g., 111-11M) of a plurality of chain of loads (e.g., 110) (250). Each chain of loads (e.g., 111-11M) of the plurality of chains of loads (e.g., 110) is coupled between a common node (e.g., Nc) and a corresponding output node (e.g., N1-NM). Each chain of loads (e.g., 111-11M) includes N series-coupled loads (e.g., LOAD1-LOADN), where N is an integer greater than one.

Then, a detection unit (e.g., 130) determines a maximum voltage from among the output voltages (e.g., V1-VM) (251). Each corresponding output voltage is a voltage at the corresponding output node (e.g., N1-NM). Next, the detection unit determines the minimum voltage from among the output voltages from among the output voltages (e.g., V1-VM) (252). Then, the detection unit compares the maximum voltage is with the minimum voltage to make a determination as to whether the maximum voltage from among the plurality of output voltages exceeds the minimum from among the plurality of output voltages by a threshold (253). Next, the detection unit outputs an indication based on a result of the determination (254). The process then proceeds to a return block, where other processing is resumed.

Figure 3:
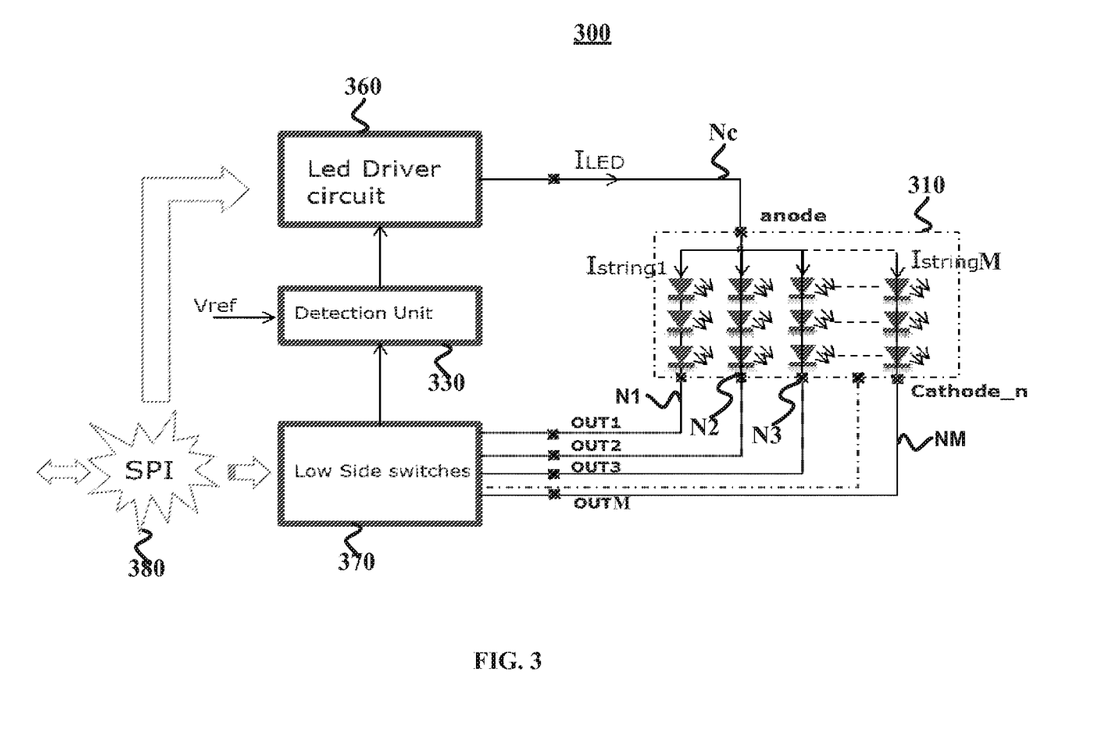
FIG. 3 is a block diagram illustrating an example of the circuit of FIG. 1.

FIG. 3 is a block diagram illustrating device 300, which may be employed as an example of device 100 of FIG. 1. In some examples, device 300 further includes LED driver circuit 360, low-side switches block 370, and SPI block 380. In some examples, each load in plurality of chains of loads 310 is an LED. Low-side switches block 370 may include, inter alia, an example of current source circuitry 120 of FIG. 1.

In some examples, LED driver circuit 360 is arranged to deliver current ILED at the output of LED driver circuit 360 during normal operation (which occurs after the start-up phase), so that LED driver circuit 360 delivers current ILED to node Nc. In some examples, LED driver circuit 360 is a DC/DC current regulator that delivers current ILED at a regulated value. In some examples, LED driver circuit 360 is a linear regulator or other type of regulator that is arranged to regulate current ILED. In other examples, LED driver circuit 360 outputs current ILED to drive the LEDs in plurality of chain of loads 310 but does not perform regulation. In some examples, there is a shunt resistance (not shown) in series with the load (310), where the voltage across the shunt resistance is received by LED driver circuit 360 as a feedback signal to be used to regulate current ILED, since the shunt resistance has current ILED across the shunt resistance and therefore has a voltage across the shunt resistance that is proportional to current ILED.

Device 300 may enable the early detection of a single short circuit (or more than one short circuit) in a chain of multiple LED arrays module, in an LED module with single anode and multiple cathodes. Plurality of chains of LEDs loads 310 may be an example of such an LED module. Device 300 may detect failure conditions in a manner that is robust against ground shifts and substantially independent of temperature variations in plurality of chains of LED loads 310.

Low-side switches block 370 may include multiple switches (not shown in FIG. 3) that connect each of the nodes N1 through NM to ground when closed. During the start-up phase, each of the switches in low-side switches block 370 is open, and test currents Itest1 through ItestM are delivered in parallel to each of the low-side switches. During normal operation (after the start-up phase), the low-side switches are closed, the test currents are not delivered, and current ILED is spread evenly among the chains of LED loads as currents Istring1 through IstringM in plurality of chains of LED loads 310.

In some examples, as illustrated in FIG. 3, detection unit 330 receives reference voltage Vref. In some examples, detection unit 330 is capable of determining when a failure conditions occurs in one or more LEDs in plurality of chains of LED loads 310, based on voltages V1 through VM received at nodes N1 through NM.

In some examples, when a fault is detected by detection unit 330, SPI block 380 communicates to LED driver circuit 360 that a fault has been detected. In some examples, SPI block 380 is arranged to communicate timing information to low-side switches block 370, including, for example, information as when the start-up phase beings and ends. In various other examples within the scope and spirit of the disclosure, SPI block 380 may be replaced with some form of communication other than SPI.

Examples of detection unit 330 can perform early detection (e.g., before the turn on of the application) of one or more shorts (including a single short) of an LED in a chain of multiple LED arrays with a single anode and multiple cathodes, such as plurality of chains of LED loads 310. This type of load may be popular due the low fabrication cost for the application (use only one wire to connect the led driver and the LED module), and this type of load may be widely used especially in the automotive environment.

Figure 4:
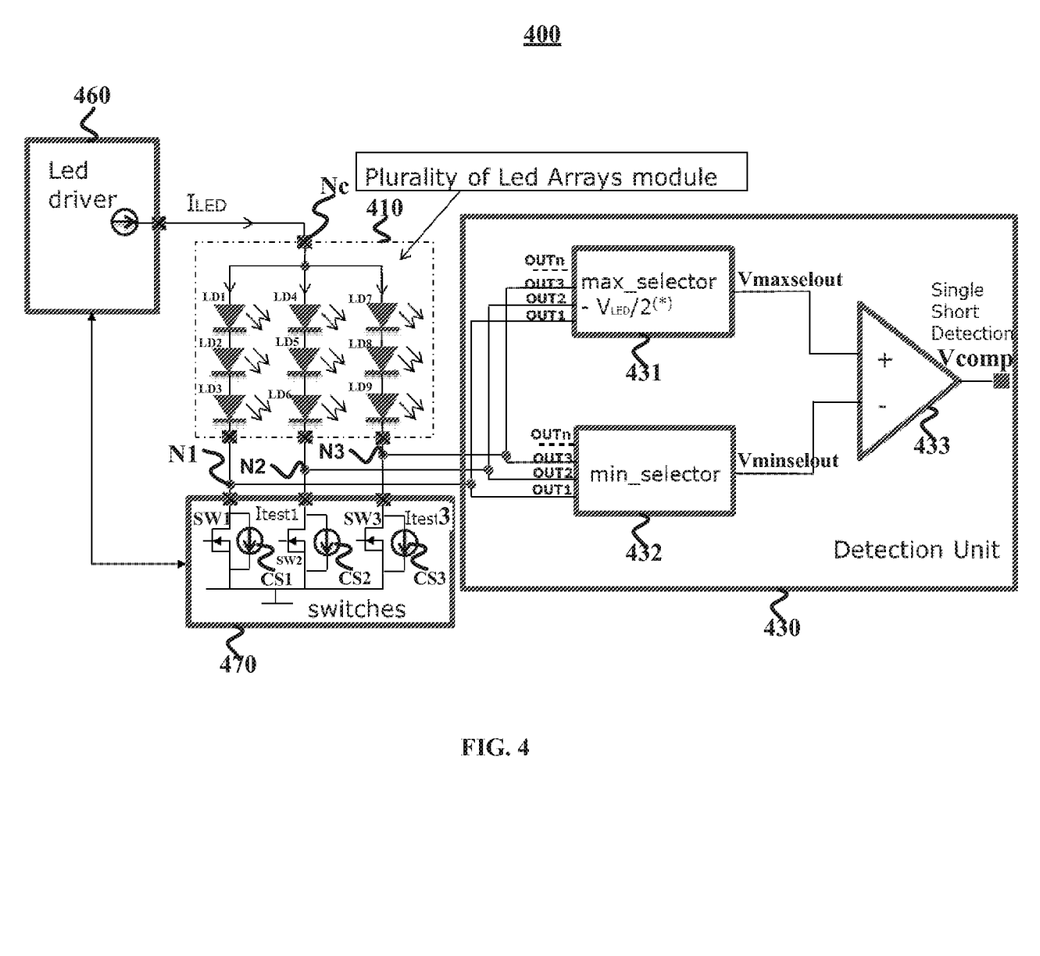
FIG. 4 is a block diagram illustrating an example of the circuit of FIG. 3, in accordance with aspects of the present disclosure.

FIG. 4 is a block diagram illustrating an example of device 400, which may be used as an example of device 300 of FIG. 3. Module 410 is an example of plurality of chains of LED loads 310 of FIG. 3. In the example illustrated, module 410 includes LEDs LD1-LD9. In the example illustrated, low-side switch block 470 includes switches SW1-SW3 and current sources CS1-CS3. In some examples, detection unit 430 includes maximum selector circuit 431, minimum selector circuit 432, and comparator 433.

In some examples, switches SW1-SW3 are low-side switches. In the example illustrated, switch SW1 is coupled between node N1 and ground, switch SW2 is coupled between node N2 and ground, and switch S3 is coupled between node N3 and ground. In these examples, switches SW1-SW3 are arranged to be open during the start-up phase, and to be closed during normal operation.

In some examples, low side switches block 470 is arranged as follows. Current sources CS1-CS3 are coupled in parallel with switches SW1-SW3, respectively. Current source CS1 is arranged to deliver current Itest1 during the start-up phase, current source CS2 is arranged to deliver current Itest2 during the start-up phase, and current source CS3 is arranged to deliver current Itest3 during the start-up phase.

In some examples, each current source CS1 through CS3 is arranged to deliver, during the start-up phase, a corresponding test current of less than 200 μA. For instance, in some examples, each current source CS1 through CS3 is arranged to deliver, during the start-up phase, the corresponding test current in the range of 10-100 μA. In some examples, current sources CS1-CS3 may each include a bandgap voltage with a current mirror and a resistor. In other examples, current sources CS1-CS3 may be implemented in other suitable ways.

Module 410 is arranged as follows in some examples. LEDs LD1 through LD3 are coupled in series with each other, with LED LD1 coupled to node Nc, and LED LD3 coupled to node N1. LEDs LD4 through LD6 are coupled in series with each other, with LED LD4 coupled to node Nc, and with LED LD6 coupled to node N2. LEDs LD7 through LD9 are coupled in series with each other, with LED LD7 coupled to node Nc, and with LED LD9 coupled to node N3. Each of the LEDs LD1 through LD9 are all on the same module 410.

Each of the LEDs LD1 through LD9 is selected to have the same expected forward voltage drop VLED. For example, each of the LEDs LD1 through LD9 may be of the same color and binning class, where LEDs of the same color and binning class have the same expected forward voltage drop VLED. Even though the LEDs have the same expected voltage drop VLED, the actual voltage drop of the different LEDs may vary from part to part. For example, a red LED from binning class 3B may have an expected forward voltage drop of 2.125V, but the actual voltage drop typically varies from 2.05V to 2.20V. The threshold voltage Vthresh is sufficiently large to ensure that a fault is not falsely detected as a result of variation in the actual forward drop of the LEDs from part to part.

FIG. 4 shows a specific example in which module 410 includes three series-coupled LED chains, in which each series-coupled LED chain includes three series-coupled LEDs in plurality of LED arrays module 410. However, as discussed in greater detail above with respect to FIG. 1, more generically, there are M series-coupled LED chains, in which each series-coupled LED chain includes N series-coupled LEDs, where N and M are both integers greater than one. In the specific example illustrated in FIG. 3, N=3 and M=3, by way of example.

In some examples, short detection may be accomplished as follows. If, during the start-up phase, current ILED is greater than the sum of the current sources (Itest1+ . . . ItestM), the voltage at node Nc will rise up. The corresponding cathode voltage of each LED chain will follow as soon as the voltage on the cathode is higher than the sum of the single LED threshold. A single (or multiple) short failure is detected by detection unit 430 by comparing the result of maximum selector 431 and minimum selector 432 on the voltage at the cathode of each channel (i.e., comparing the maximum from among voltages V1-VM with the minimum from among voltages V1-VM).

Also, although maximum selector circuit 431 and minimum selector circuit 432 are shown as separate circuits, in some examples, there may be some circuitry in common between maximum selector circuit 431 and minimum selector circuit 432, so that a portion of maximum selector circuit 431 is a portion of minimum selector circuit 432 in these examples.

Maximum selector circuit 431 may be arranged to receive voltages V1 through VM, and to output, at the output of maximum selector circuit 431, voltage Vmaxselout, a voltage equal to the maximum voltage from among voltages V1 through VM, less VLED/2. Minimum selector circuit 432 may be arranged to receive voltage V1 through VM, and to output, at the output of minimum selector 430, voltage Vminselout, a voltage equal to the minimum voltage from among voltages V1 through VM.

Comparator 433 may be arranged to compare voltage Vmaxselout with voltage Vminselout, and to output voltage Vcomp at the output of comparator 433 based on the comparison.

In some examples, when voltage Vmax-Vthresh is less than Vmin, comparator 433 outputs Vcomp such that Vcomp as unasserted, indicating that no failure is detected. Conversely, in these examples, when voltage Vmax-Vthresh is greater than Vmin, comparator 433 asserts Vcomp, indicating that a failure is detected, such as a short condition in one or more of the LEDs LD1 through LD9. Vthresh is VLED/2 in some examples, where VLED is the expected forward voltage drop of each of the LEDs. Device 400 is capable of detecting a single short (among LEDs LD1 through LD9), and when a single short is detected, Vcomp is asserted. The single short is detected as soon as Vmax-VLED/2 is greater than Vmin.

In some examples, voltage Vcomp may act as a status signal that is output via a status pin (not shown), such that comparator 433 generates voltage Vcomp as a status signal. In various examples, other circuitry may respond in various ways when voltage Vcomp is asserted. In some examples, module 410 is turned off when voltage Vcomp is asserted, and all of the LEDs LD1 through LD9 are accordingly turned off. Also, in some examples, LED driver circuit 460 stops delivering current when a short is detected so that damage to LEDs on the chain is prevented.

In some examples, in response to the detection of a short, LED driver circuit 460 stops delivering any current. In other examples, in response to detection of a single short, only the chain that has the short is turned off. In some examples of device 400, device 400 is capable to determining which chain has the short, and in these examples, it is possible to turn off only the chain that has the short—in these examples, a corresponding adjustment of the voltage at the anode may be made and the amount of current being delivered. In other examples of device 400, device 400 is capable of determining whether a short is present in one of the LEDs LD1-L9, but cannot determine which LED or in which chain the short is present, only that one of the LED is shorted.

Maximum selector circuit 431 and minimum selector circuit 432 may be implemented in various ways in various examples. In some examples, maximum selector circuit 431 and minimum selector circuit 432 each consist of M diodes, with the M diodes in the maximum selector circuit having a common cathode to output the maximum voltage and each separate anode being coupled to a separate one of the voltages V1 through VM, and M diodes in the minimum selector circuit having a common anode to output the minimum voltage and each separate cathode being coupled to a separate one of the voltages V1 through VM. In other examples, maximum selector circuit 431 and/or minimum selector circuit 432 may include a multi-input comparator and a multiplexer. In other examples, maximum selector circuit 431 and/or minimum selector circuit 432 may convert voltages V1 and VM into digital values with an analog-to-digital converter, use digital logic or the like determine which value is the maximum and/or the minimum, output the result as a digital value, and then use an digital-to-analog converter to convert the output digital value into a voltage, or in other examples instead use the output digital value to control a multiplexer to select the determined maximum or minimum from among V1 through VM at the output of maximum selector 431 and/or minimum selector 432.

In some examples, part or all of the circuitry of maximum selector circuit 431 and minimum selector circuit 432 may be combined. In some examples, rather than employing separate circuits for maximum selector circuit 431 and minimum selector circuit 432, device 400 may employ a single maximum/minimum selector circuit that outputs both a maximum voltage Vmaxselout as the maximum from among voltage V1 through VM as Vmaxselout and a minimum voltage from among V1 through VM as Vminselout. However, in these examples, the combined circuit may still be regarded a maximum selector circuit and a minimum selector circuit, with those portions of the circuitry that determine and output the maximum voltage from among V1 and VM regarded as the maximum selector circuit and those portions of the circuitry that determine and output the minimum voltage from among V1 through VM as the minimum selector circuit; even if the maximum selector circuit and the minimum selector circuit share some circuitry, they can still be regarded as a maximum selector circuit and a minimum selector circuit.

In some examples, maximum selector circuit 431 may operate as means for determining, during a start-up phase, a maximum voltage from among a plurality of output voltages (e.g., OUT1-OUT3). In some examples, minimum selector circuit 432 may operate as means for determining, during the start-up phase, a minimum voltage from among the plurality of output voltages. In some examples, comparator 433 may operate as means for comparing, during the start-up phase, the maximum voltage from among the plurality of output voltages with the minimum voltage from among the plurality of output voltages to make a determination as to whether the maximum voltage from among the plurality of output voltages exceeds the minimum from among the plurality of output voltages by a threshold voltage. In some examples, comparator 433 (in conjunction with other components of detection unit 430) may operate as means for providing, during the start-up phase, an indication based on a result of the determination.

Also, FIG. 4 shows a specific example of device 400 in which module 410 includes chains of series-coupled LEDs. As discussed in greater detail above with regard to claim 1, in various examples, various other types of loads may be employed rather than LEDs. Chains of series-coupled LEDs are one example of chains of series-coupled loads used for module 410; other examples may be used within the scope and spirit of the disclosure.

Also, FIG. 4 shows a specific example in which the threshold voltage Vthresh has a fixed, substantially constant value of VLED/2, where VLED is the expected forward voltage drop of each of the LEDs. In other examples, as discussed in greater detail above with regard to FIG. 1, other suitable values for threshold voltage Vthresh may be employed, and in some examples, threshold voltage Vthresh may be set and/or adjusted by the user. The threshold voltage Vthresh is sufficiently large to ensure that a fault is not falsely detected as a result of variation in the actual forward drop of the LEDs from part to part. In some examples, Vthresh is a constant defined internally, and in other examples, Vthresh is based on information provided by an external pin. These examples and others are within the scope and spirit of the disclosure.

One example of single short detection with N=3 and M=3 is as follows. At the start-up procedure start, all the switches (SW-SW3) are off, and because the ΣItestM<ILED, the voltage at node Nc increases. As soon the voltage at node Nc reaches three times the expected single LED voltage, the voltage of the cathodes of the LEDs in module 410 start to rise up.

In this example, if there is no fault, all the cathodes of the LED in module 410 will rise up at the same time, and output of comparator 433 will stay low (the output of comparator 433 is asserted high in this example). The procedure will be stopped as soon as the Min{VOUT_i}>Vthresh, and at this point, to safely turn on LED LD1-LD9 and switches SW1-SW3, LED driver 460 is turned off until Max {OUT_i}<100 mV—at this point, switches SW-SW3 can be turned on and LED driver 460 can restart to deliver output current ILED.

Conversely, in this examples, if there is a fault (e.g., a short of a single LED on chain 1), the maximum from among voltages V1 through VM less Vthresh will exceed the minimum from among voltages V1 through VM. At this point, the output of comparator 433 goes high, indicating the fault.

In some examples, block 470 may operate as means for providing, during the start-up phase, each corresponding test current of a plurality of test currents to a corresponding chain of loads of a plurality of chain of loads.

Various examples have been described. Many details of techniques of this disclosure have been described in the context of a device that includes a multi-channel single LED. However, the technique may also be applied with respect to other types of semiconductor light sources, or in other situations or devices that define a plurality of series load voltages. These and other examples are within the scope of the following claims.

What is claimed is:

1. A method, comprising:
   during a start-up phase:
   delivering each corresponding current of a plurality of currents to a corresponding chain of loads of a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one;
   determining a maximum voltage from among a plurality of output voltages, wherein each of the plurality of output voltages corresponds to a separate one of the plurality of output nodes;
   determining a minimum voltage from among the plurality of output voltages; and
   comparing the maximum voltage with the minimum voltage to make a determination as to whether the maximum voltage exceeds the minimum voltage by a threshold; and
   outputting an indication based on a result of the determination.

2. The method of claim 1, further comprising:
   after the start-up phase, delivering a regulated current to the common node.

3. The method of claim 1, wherein each corresponding current is less than 200 μA.

4. The method of claim 1, wherein comparing the maximum voltage with the minimum voltage is accomplished such that the threshold is substantially equal to half of an expected voltage drop across each load of the N series-coupled loads of each chains of loads.

5. The method of claim 1, wherein comparing the maximum voltage with the minimum voltage is accomplished such that the threshold is a substantially fixed, constant voltage.

6. The method of claim 1, further comprising adjusting the threshold based on user input.

7. The method of claim 1, wherein each load of the N series-coupled loads of each chain of loads a light-emitting diode (LED).

8. The method of claim 7, further comprising de-activating a module that includes each load of the N series-coupled loads of each chain of loads when the status signal is asserted.

9. The method of claim 7, wherein the threshold is substantially equal to half of a forward voltage drop of each of the LEDs.

10. A method, comprising:
    during a start-up phase:
    delivering each corresponding current of a plurality of currents to a corresponding chain of loads of a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one;
    determining a maximum voltage from among a plurality of output voltages, wherein each of the plurality of output voltages corresponds to a separate one of the plurality of output nodes;
    determining a minimum voltage from among the plurality of output voltages; and
    comparing the maximum voltage with the minimum voltage to make a determination as to whether the maximum voltage exceeds the minimum voltage by a threshold; and
    outputting an indication based on a result of the determination, wherein the outputting the indication is accomplished such that the indication is provided as a status signal, such that the status signal is asserted if it is determined that the maximum voltage threshold exceeds the minimum voltage threshold by the threshold, and such that the status signal is unasserted otherwise.

11. The method of claim 10, wherein comparing the maximum voltage with the minimum voltage is accomplished such that the threshold is such that the status signal is asserted when a single short circuit condition occurs among any of the N series-coupled loads of each chains of loads.

12. A device, comprising:
    a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one;
    current source circuitry that is arranged to deliver, during a start-up phase, each corresponding current of a plurality of currents to a corresponding chain of loads of the plurality of chain of loads; and
    a detection unit that is arranged to:
    during the start-up phase:
    determine a maximum voltage from among a plurality of output voltages, wherein each corresponding output voltage is a voltage at the corresponding output node of the plurality of output nodes;
    determine a minimum voltage from among the plurality of output voltages;
    compare the maximum voltage threshold with the minimum voltage threshold to make a determination as to whether the maximum voltage threshold exceeds the minimum voltage threshold by a threshold; and
    output an indication based on a result of the determination.

13. The device of claim 12, further comprising a driver circuit that is configured to deliver a regulated current to the common node after the start-up phase.

14. The device of claim 12, wherein the detection unit is configured such that the threshold is substantially equal to half of an expected voltage drop across each load of the N series-coupled loads of each chains of loads.

15. The device of claim 12, wherein the current source circuitry includes:
- a plurality of current sources, wherein each current source is arranged to deliver the corresponding current to the corresponding chain of loads of the plurality of chain of loads; and
- a plurality of switches, where each corresponding switch is coupled in parallel with a corresponding one of the plurality of current sources.

16. The device of claim 12, wherein each load of the N series-coupled loads of each chains of loads a light-emitting diode (LED), and wherein the comparison circuit is configured such that the threshold is substantially equal to half of a forward voltage drop of each of the LEDs.

17. The device of claim 12, wherein the detection unit is configured such that the threshold is a fixed, constant value.

18. The device of claim 12, wherein the detection unit is configured such that the threshold is adjustable based on user input.

19. A device, comprising:
- means for providing, during a start-up phase, each corresponding current of a plurality of currents to a corresponding chain of loads of a plurality of chain of loads, wherein each chain of loads of the plurality of chains of loads is coupled between a common node and a corresponding output node of a plurality of output nodes, wherein each chain of loads includes N series-coupled loads, and wherein N is an integer greater than one;
- means for determining, during the start-up phase, a maximum voltage from among a plurality of output voltages, wherein each corresponding output voltage is a voltage at the corresponding output node of the plurality of output nodes;
- means for determining, during the start-up phase, a minimum voltage from among the plurality of output voltages; and
- means for comparing, during the start-up phase, the maximum voltage threshold with the minimum voltage threshold to make a determination as to whether the maximum voltage threshold exceeds the minimum voltage threshold by a threshold; and
- means for providing, during the start-up phase, an indication based on a result of the determination.

20. The device of claim 19, further comprising:
means for providing, after the start-up phase, a regulated current to the common node.

* * * * *